United States Patent [19]

Pearson et al.

[11] 4,071,594

[45] Jan. 31, 1978

[54] PRODUCTION OF CONTINUOUS CERAMIC FIBERS

[75] Inventors: Alan Pearson, St. Louis; Leroy D. Hart, Crestwood, both of Mo.

[73] Assignee: Aluminum Company of America, Pittsburgh, Pa.

[21] Appl. No.: 660,813

[22] Filed: Feb. 24, 1976

Related U.S. Application Data

[63] Continuation of Ser. No. 502,676, Sept. 3, 1974, which is a continuation-in-part of Ser. No. 269,343, July 6, 1972, abandoned.

[51] Int. Cl.$^2$ .......................... D01D 5/04; C04B 35/10
[52] U.S. Cl. ......................................... 264/63; 106/57; 106/58; 106/60; 106/65; 106/66; 264/67; 264/DIG. 19

[58] Field of Search ................... 264/DIG. 19, 63, 65, 264/67, 143; 106/65, 43, 44, 55, 57, 58, 66, 69, 73.3, 73.33, 60, 73.4, 73.5

[56] References Cited

U.S. PATENT DOCUMENTS

| | | | |
|---|---|---|---|
| 3,846,527 | 11/1974 | Winter et al. | 264/63 |
| 4,010,233 | 3/1977 | Winter et al. | 264/63 |

*Primary Examiner*—Jay H. Woo
*Attorney, Agent, or Firm*—Carl R. Lippert

[57] ABSTRACT

Thin continuous fibers or filaments of alumina or other ceramic or refractory materials are extruded, attenuated and wound from a slip comprising particles of the refractory or ceramic material and selected resins or binders comprising a high molecular weight linear chain polyethylene oxide polymer and an organic solvent. These fibers are then heated to provide a ceramically bonded refractory product.

17 Claims, No Drawings

PRODUCTION OF CONTINUOUS CERAMIC FIBERS

This is a continuation of application Ser. No. 502,676, filed Sept. 3, 1974, which is a continuation-in-part of U.S. Ser. No. 269,343, filed July 6, 1972, now abandoned.

BACKGROUND OF THE INVENTION

There is a continuing and growing need for ceramic or refractory materials in fiber form especially where the material has a high melting temperature. Such fibers are useful as high temperature insulation and even as strengtheners in composites which may have a metal matrix. To date a number of processes for producing fibers have been proposed but most have some disadvantages with respect to the quality and consistency of the fibers or in the economics of their production. For instance, some of the fibers are short and of inconsistent cross section and quality thus restricting their use as strengtheners or high temperature insulation. Other processes may be capable of producing longer lengths of more consistent cross section but are marked by economic disadvantages which seriously restict their usefulness. Still other processes rely on precursor fibers of material which undergoes undesirable phase changes with resultant degradation upon heating to useful temperatures. In accordance with the present improvement long and very thin fibers or filaments of alumina or other ceramic materials can be provided which in the green (unfired) state possess sufficient strength that they can be wound onto spools or otherwise handled with minimal degradation. Since these fibers are comprised of finely divided particles of phase-stable ceramic material, they can be heated to provide ceramic bonding without undesirable high-temperature phase changes. This results in low cost refractory fiber having small diameter and sufficient strength for use as high-temperature insulating material and other applications.

DESCRIPTION OF THE PREFERRED EMBODIMENT

Briefly, alumina or other refractory oxide or ceramic material can be produced in continuous filament form by extrusion or other fiber forming techniques which may be coupled with attenuation or stretching, from a slip selectively composed as herein described. The slip comprises the alumina or other ceramic material suspended in a finely divided state, together with a binder comprising a high molecular weight linear chain polyethylene oxide polymer, in a suitable solvent, preferably an organic solvent. A dispersing agent should be employed to facilitate a high solids content where desired in the slip while maintaining fluidity. Also, the slip may contain additional resinous binders to improve the strength of the green fiber threads before firing. Where such additional binders decrease the flexibility of the green fiber a compatible plasticizer may be included as is the known practice in formulating resin systems containing such binders. The additional binders and plasticizers may not be sufficiently soluble in the principal solvent and additional solvents may be employed to advantage.

The invention is described with particular reference to the production of alumina fibers although it should be understood that the invention should find use in the production of other ceramic refractory oxide fibers such as zirconia, titania, and others. For example ferric oxide ($Fe_2O_3$), chromia ($Cr_2O_3$) and zircon ($ZrSiO_4$) have been produced as continuous green filaments by the improved method. It is important that the ceramic material be provided in a very finely divided state to insure production of fine fibers. It is preferred that the particles exhibit median diameters of 3 microns or less, for instance 0.05 or 0.1 to 2.5 or 3 microns although still smaller particles may be even more desired in some instances. The desired small particle sizes can be achieved by grinding, milling or other known methods of subdivision. Referring to the particular embodiment employing alumina it is desirable that the alumina be in the form of minute crystallite particles having a median crystallite diameter of 0.05 or 0.1 to 2.5 microns or even still smaller sizes may be preferred in some instances.

In addition to particle size the ceramic material crystalline phase can be important. Where undesirable phase changes would be encountered in firing the fiber, the ceramic particles should be substantially in the phase condition desired in the final fiber product. For instance referring to the case of alumina, firing tends to impart the stable alpha phase. If another phase dominated the starting material then firing would cause the undesirable dimensional and grain size changes associated with the attendant phase changes. Thus, for alumina the starting material should be primarily of the alpha phase.

Where alumina forms the suspended phase it may be desirable to include a small amount of magnesia or talc (magnesium silicate) which perform the known function of inhibiting grain growth in the fired refractory fibers. Larger quantities of glass-forming fluxes may be added if desired but at a sacrifice in refractoriness. For example, 0.5 to 3.0% talc has been added to an otherwise pure alumina composition with no noticeable effect on green fiber production. A talc level of 1.0% or less is preferred to improve tensile strength with minimum sacrifice in refractoriness.

In accordance with the invention it is highly important that a resinous binder be included in the slip and that this binder be a linear chain polyethylene oxide polymer. The polymer should have approximate or average molecular weight of at least 400,000 and preferably at least 700,000. One such suitable polymer is marketed commercially under the trade name "Polyox" by the Union Carbide Corporation and is available in a number of average or approximate molecular weight levels. It has been found that the use of the high molecular weight linear chain polyethylene oxide polymer is essential to achieving the desired fiber forming characteristics in accordance with the present invention. This polymer imparts to the slip a pituitous characteristic which enables consistently forming fine and continuous filaments under economically attractive conditions. Generally, as the molecular weight of the linear polyethylene oxide polymer increases, solubility decreases and pituitousness increases. Polymers with average molecular weights of about 400,000 to above 6,000,000 at concentrations of about 5 to 0.5% (solvent weight basis) have been successfully used in this process. A preferred range of average molecular weights is 600,000 to 1,500,000 at concentrations of 5 to 2%, the higher concentrations corresponding to lower molecular weights.

Solvents found particularly suitable in formulating slip suspensions to produce alumina fibers in accordance with the invention are trichloroethylene and ethylene dichloride which are considered preferred; of these two the former is more preferred because of its lower volatility. It was found that these two solvents could dissolve substantial amounts of the polyethylene oxide polymer while otherwise remaining compatible with the other requisites for the slip suspension. Thus while a number of organic and even aqueous type solvents may dissolve the polyethylene oxide polymer to some extent the above-described trichloroethylene and ethylene dichloride solvents are highly preferred solvents in practicing the invention. However, the invention is not necessarily intended to be restricted to the use of these two solvents which nonetheless are preferred since to date they have been extremely successful, especially trichloroethylene. As described below, mixtures of solvents may also be used to advantage in the practice of this invention.

As just mentioned, while trichloroethylene is a preferred solvent in practicing the invention, there are other organic solvents which also should be useful. The characteristics of suitable organic solvents are that they be capable of dissolving substantial amounts of polyethylene oxide, 0.5 to 5% specifically, based on the solvent weight, that they have a surface tension of not more than 50 dynes/cm and that they have sufficient volatility to render a fiber self-supporting. On the subject of surface tension, it is believed that as the surface tension, at fiber forming temperature, exceeds 50 dynes/cm, the fiber forming operation is seriously impaired in that considerably amounts of shot (spherical bodies) or or strings with spherical discontinuities are formed as opposed to pure fiber. This is why water is unsuited in practicing the invention as its surface tension is 58 dynes/cm at 100° C and 74 dynes/cm at 0° C. On the subject of volatility, it can be said that the solvent should have a substantial volatility, but it need not be extremely volatile. For instance, as explained in more detail below, effective organic solvents have been found which have boiling points significantly above and significantly below that of water. Nonetheless, the volatility must be sufficient that enough of the solvent is evaporated at fiber forming temperature to leave the fibers self-supporting. Obviating, a more volatile solvent can be used in greater amounts than a less volatile solvent.

Turning now to a most important requisite for the organic solvent, dissolution of substantial amounts of high molecular weight polyethylene oxide polymer is of great importance in practicing the invention. While polyethylene oxide polymer is considered highly soluble in water, high molecular weight polymer is not especially dissolvable in many widely used organic solvents. For instance, alcohols, ketones and even acetone are not particularly suited to dissolving significant amounts of polyethylene oxide. To illustrate the solubility (or insolubility) of high molecular weight polyethylene oxide polymer in various organic solvents, reference is made to Table I which lists the solubility of polyethylene oxide polymer in a number of organic solvents as a percent of the total weight of the solution. Also shown are the results of pituity tests which provide some measure of the potential fiber stretching characteristics of a given solution of polyethylene oxide in a solvent. For the organic solvents the information in Table I is based on a polyethylene oxide polymer with an average molecular weight of 900,000. Solubility was determined by adding the polymer to the solution and gently stirring, and the solubility figure listed designates the polymer dissolved as a percent of the total solution weight of a saturated solution at room temperature after standing 2 days or more. The pituity test is performed by measuring the time required for a tail of a drop to disappear after the drop of solution drips from a 20 gauge hypodermic needle to a surface 2 centimeters below. Each positive time figure represents an average of 25 tests. Data on an aqueous solution is included for comparison in Table I; the polyethylene oxide used here had an average molecular weight of 4 million in order to favor pituitousness.

Table I

| Solvent | | % Polymer | Pituity test-seconds[3] |
|---|---|---|---|
| Type | Compound | | |
| Aromatic hydrocarbon | Benzene | .15 | 0 |
| Alcohol | Isopropanol | 0.0 | 0 |
| | Methanol | .086 | 0 |
| | N Hexanol | .15 | 0 |
| Ketone | Methyl-ethyl ketone | .013 | 0 |
| | Methyl-isobutyl ketone | .048 | 0 |
| | Acetone | .053 | 0 |
| Ester | Ethyl acetate | .027 | 0 |
| | Amyl acetate | .23 | 0 |
| Chlorinated hydrocarbon | Carbon tetrachloride | .018 | 0 |
| | Perchloroethylene | .027 | 0 |
| | Trichloroethane (1,1,1) | .0 | 0 |
| | Trichloroethane (1,1,2) | 4.2 | 1.8 |
| | Trichloroethylene | 3.9 | 1.3 |
| | Tetrachloroethane | 3.9 | 2.0 |
| | Water | 2.0 | 2.5 |

From the above Table it can be seen that the alcohols and ketones and even acetone and esters or aromatics do not function as good solvents for polyethylene oxide polymer of high molecular weight. Experience to date has shown that only relatively few organic solvents are capable of dissolving significant amounts of high molecular weight polyethylene oxide. These fall into the classification of halogenated hydrocarbons and more specifically chlorinated hydrocarbons. But even of the chlorinated hydrocarbons, not all are effective. Even within a given compound different isomers can produce different results as indicated in the above Table for trichloroethane. The (1,1,1) version failed to dissolve any polyethylene oxide whereas the (1,1,2) version dissolved a substantial amount and produced a favorable result in the pituity test. Experience has shown that where a solvent fails to dissolve a significant amount of polyethylene oxide, specifically 0.5 to 5%, at fiber forming temperature, typically room temperature, it is not really suited to practicing the invention. Further, even having dissolved a significant quantity of polyethylene oxide, the solution should produce a pituity test result of at least one-half second in order to be suited to practicing the present invention.

Table I indicates that water will dissolve 2%, or even more, of polyethylene oxide and readily produces a pituity test time of 2.5 seconds. However, even where the polyethylene oxide dissolved is of a very high molecular weight, for instance 4 million average, the solution is not suited to forming fibers, as fiber forming attempts by extrusion and attenuation result in the production of shot. It is believed this shortcoming is caused by water's relatively high surface tension, 74 dynes/cm at 0° C, and this is why water is not suited in practicing the invention.

Table II lists the boiling points of several useful solvents in practicing the invention, along with water for comparison purposes.

Table II

| Solvent | Boiling Point (° C) |
| --- | --- |
| Trichloroethane (1,1,2) | 114 |
| Trichloroethylene | 87 |
| Tetrachloroethane | 146 |
| Ethylene dichloride | 37 |
| Water | 100 |

From the Table it can be seen that solvents suitable in practicing the invention can have boiling points above or below water although each of the listed organic solvents is certainly classified as volatile.

Thus in practicing the invention, the organic solvent should meet requisite surface tension, volatility and solution of polyethylene oxide polymer. It should have a surface tension not exceeding 50 dynes/cm and most organic solvents readily satisfy this requisite. For instance tetrachloroethane has a surface tension of 36 dynes/cm at 22° C and trichloroethane (1,1,1) of 22 dynes/cm at 114° C. Requisite volatility is also achieved in most organic solvents. However, the ability to dissolve substantial amounts of polyethylene oxide polymer of a high molecular weight is considered a most critical aspect in choosing a solvent for use in practicing the invention and the tests described above in connection with Table I provide considerable insight into the selection of such a solvent, although the ultimate test is the actual fiber forming performance. Nonetheless, test information of the type shown in the Table is most useful in selecting organic solvents. The organic solvents found to be most useful are halogenated hydrocarbons and particularly chlorinated hydrocarbons. Of the chlorinated hydrocarbons, trichloroethylene, ethylene dichloride, tetrachloroethane, and (1,1,2) trichloroethane have been found to be particularly suitable, with trichloroethylene being preferred from this group of highly operative species.

In order to obtain a relatively high solids content in the slip a suitable dispersant may be employed. Although not absolutely necessary, a high solids content favors the lowest cost in making the fibers and is often highly desirable for this and other reasons. The requisites for a suitable dispersant are solubility in the solvent, compatibility with the other system ingredients and the ability to reduce the natural attraction between suspended particles. In the case of alumina there are a number of known dispersants which can be employed with the organic solvents described above. Polyunsaturated natural oil is quite suitable for this purpose, fish oil serving quite well. Certain unsaturated fatty acids are suitable as dispersants, oleic and ricinoleic acids being examples. Another natural derivative, oil of peppermint, has also proved effective. While the four dispersants just mentioned are highly satisfactory, it is expected there are many more which should also be useful. The dispersing agent, if used, should be about 0.1 to 5.0%, weight % on solids basis, and preferably 1.0 to 2.0%.

In order to improve the strength of the green fiber (before firing) additional binders may be employed as explained more below; this, in turn, can necessitate additional solvents to assure solution of the binder in the slip. The advantages in increasing the strength of the fibers before firing are significant in that the higher strength minimizes breakage and can permit further stretching to form finer fiber diameters with less risk of breakage and this becomes significant where a number of fibers are being simultaneously extruded from a single source or reservoir and fiber breakage produces undesirable interruptions or impaired production levels. As is known, the use of some binders which may be brittle resins at room temperature can result in increased stiffness in the green fiber and accordingly the use of these binders suggests the use of one or more plasticizers to offset the stiffness. Hence, the invention contemplates the use of such compatibly plasticized resins which is considered to mean an inherently plasticized resin or a resin used in combination with a compatible plasticizer so that the resin does not diminish the flexibillity of the green fiber to an excessive extent. As an example of a suitable resin polyvinyl butyral has been employed but requires the use of compatible plasticizers. The polyvinyl butyral cited herein is available from Monsanto Chemical Co. under the trade name "Butvar." Two grades. B-98 and B-76 have been used interchangeably in the improved process. In an alumina slip containing trichloroethylene and ethyl alcohol as solvents and Butvar as a binder, plasticizers which have proven effective and compatible are polyethylene glycol, butyl phthalate, octyl phthalate and castor oil. Although these specific plasticizers are cited here, many others would likely be suitable as well, and it would be extremely difficult to attempt to list even a large proportion of such for instance, the manufacture lists 20 plasticizers for "Butvar" alone.

The use of an additional binder with or without a plasticizer may necessitate the use of additional solvents. For instance, considering the case of an alumina suspension in trichloroethylene solvent, a polyvinyl butyral-polyethylene glycol binder-plasticizer combination is difficult to dissolve. However, the addition of a small amount of a solvent mutually compatible with the major trichloroethylene solvent and the additional binder-plasticizer combination such as ethyl alcohol, is advisable in order to provide a true solution of organic components suspending the alumina or other ceramic particles.

The amount of suspended ceramic solids can vary from 5 to 80 weight % of the slip composition. In general a lower solids level favors the production of finer fibers but at increased cost over higher solids levels. Also the user of finer solids particles favors finer fibers and involves lower solids content. Preferred solids content ranges from 25 to 6 weight %.

The amount of dispersant present is typically around 0.1 to 5% of the amount of alumina or other ceramic material present. As indicated earlier it is essential that the solvent or vehicle also contain the high molecular weight linear chain polyethylene oxide polymer which should be present in amounts of from 0.5 to 5% of the weight of the solvent present depending upon the molecular weight of the polymer, larger amounts being advisable for lower molecular weights. In a preferred embodiment where the polymer molecular weight is at least 600,000, the amount of polymer should vary from about 2 to 5% of the amount of solvent present. Where resin binders are additionally included they are typicaly present in amounts varying from about 0.5 to 4% of the weight of the solvent present. On a weight basis the amount of plasticizer present is typically similar to the amount of an additional resin binder but the relationships between plasticizer and resin are already known in the art and do not need extensive elaboration here. What is generally done in adding plasticizer is to determine that amount which produces best results in a given system. Where additional resin binders are employed ethyl alcohol is a suitable solvent addition and is typically present in amounts varying from 2 to 6 times the amount of resin binder included.

All the foregoing formulations are intended as a guide but the invention is not necessarily intended to be limited thereto. In the case where the ceramic is alumina and the solvent is selected from the group consisting of trichloroethylene and ethylene dichloride, the examples below set forth preferred compositions.

EXAMPLE 1

| Component | Parts by Weight |
| --- | --- |
| Alumina | 41.7 |
| Fish Oil | 0.2 |
| Ethylene Dichloride | 56.8 |
| Polyethylene Oxide (average MW 1,000,000) | 1.3 |
| Total | 100.00 |

EXAMPLE 2

| | |
| --- | --- |
| Alumina | 31.8 |
| Fish Oil | 0.5 |
| Trichloroethylene | 64.8 |
| Polyethylene Oxide (average MW 830,000) | 2.9 |
| Total | 100.00 |

EXAMPLE 3

| | |
| --- | --- |
| Alumina | 32.2 |
| Fish Oil | 0.5 |
| Trichloroethylene | 65.8 |
| Polyethylene Oxide (average MW 1,550,000) | 1.5 |
| Total | 100.00 |

EXAMPLE 4

| | |
| --- | --- |
| Alumina | 30.3 |
| Talc | 0.3 |
| Fish Oil | 0.3 |
| Trichloroethylene | 63.2 |
| Ethyl Alcohol | 4.5 |
| Polyethylene Oxide (average MW 900,000) | 1.4 |
| Total | 100.00 |

EXAMPLE 5

| | |
| --- | --- |
| Alumina | 41.2 |
| Ricinoleic Acid | 0.4 |
| Trichloroethylene | 50.3 |
| Ethyl Alcohol | 4.5 |
| Butvar B-98 | 1.2 |
| Polyethylene Glycol | 1.2 |
| Castor Oil | 0.6 |
| Polyethylene Oxide (average MW 1,000,000) | 0.6 |
| Total | 100.00 |

EXAMPLE 6

| | |
| --- | --- |
| Alumina | 44.2 |
| Fish Oil | 0.7 |
| Ethyl Alcohol | 6.7 |
| Trichloroethylene | 42.1 |
| Butvar B-76 | 0.9 |
| Polyethylene Glycol | 1.9 |
| Butyl Phthalate | 1.6 |
| Polyethylene Oxide (average MW 760,000) | 1.9 |
| Total | 100.00 |

The ingredients employed in the practice of the invention in preparing the slip are advantageously combined carefully in order to derive the maximum benefits from the practice of the invention. It is generally preferable to combine the solvent and the ceramic separately from combining the solvent with the polyethylene oxide polymer. Thus the total desired solvent is divided into two portions which are separately combined with the ceramic and with the polymer materials. One reason for this procedure is that getting the ceramic material into suspensions usually requires a substantial amount of milling or other severe agitation and this agitation may degrade the polyethylene oxide polymer. Even getting the polyethylene oxide polymer into solution can itself be a problem. The polyethylene oxide polymer, a solid at room temperature, does not dissolve readily even with very good solvents. For instance employing the preferred trichloroethylene solvent certain care is advisable in introducing the polyethylene oxide polymer. One preferred method contemplates subdividing that portion of the solvent to be mixed with the polymer into two subportions. The first subportion is cooled to about 0° C and the polymer powder is introduced into this subportion with good agitation which disperses it in the cool solvent which does not dissolve much of the polymer. At this point the remaining solvent subportion, at room temperature, is introduced into the cool suspension which of course increases the temperature of the mixture. Since the solution rate is quite slow in the cool solvent the polymer particles can be well dispersed in the solvent before significant dissolution occurs. Adding the remaining solvent accelerates dissolution which is further enhanced by the well dispersed distribution of the polymer. If dry polymer were added to room temperature solvent, partial dissolution can very rapidly occur which in turn can cause a sharp increase in viscosity which in turn can increase the difficulty of obtaining a good dispersion of the polymer.

If it is desired to include resin binders and plasticizers such are normally introduced into the ceramic-solvent suspension or into the polyethylene oxide-solvent before the two are combined. After the ceramic-solvent suspension and the polymer-solvent solution are prepared they are then mixed to produce a homogeneous slip.

The improved slips provided in accordance with the invention exhibit a relatively unusual characteristic in slips, that characteristic being a pituitous quality which can also be expressed as the ability to be stretched. This permits the slip to be extruded and attenuated into very thin fibers without the excessive breakage occurrences which marked so many previous attempts to extrude and attenuate slips into ceramic fibers. The viscosity of the slip can be varied from 1,000 to 50,000 cp with a range of 10,000 to 20,000 cp being preferred. Viscosity in this case refers to readings obtained with a Brookfield viscometer using spindle RVT 5 at a speed of 10 rpm.

As explained below fibers are formed by extruding through orifices, a typical orifice diameter being 300 microns. However, before extruding it is preferable to filter the slip in order to remove any agglomeration of suspended or undissolved slip constitutents. It is highly preferred that the filter media have openings considerably smaller than that of the extrusion orifice. Preferably the filter cloth openings or mesh spacing should amount to one-half or less than the size of the orifice, preferably one-fourth or less. For instance employing an extrusion orifice of 340 microns it was found advisable to use a filter cloth with openings of only 36 microns in order to minimize plugging of the extrusion orifice. Filtration through a fine-mesh filter also tends to improve uniformity of both the fiber surface and extrusion-attenuation operation.

The invention contemplates extrusion of the slip to produce fibers which are rendered self-supporting substantially concurrently with the formation thereof by the evaporation of a portion or substantially all of the volatile solvent. This is accomplished by simply forcing the slip through one or more orifices and moving the fibers so produced through a short distance in contact with a drying media which can be room temperature air. Obviously the drying media can be treated in order to increase its drying effect as by heating the air. However, this can introduce some problems with respect to retarding attenuation as discussed below. The size of the orifice openings can vary considerably, typical orifice openings suitable having diameters of up to 1000 microns although openings of 400 microns or less are preferred. One preferred embodiment contemplates orifice openings of 200 to 350 or 400 microns. Still smaller openings, for example 100 microns or less, can also be employed but as orifice size decreases flow rates are reduced, pressures must be increased and plugging of the orifice becomes more frequent. Smaller orifice sizes do favor production of slightly finer diameter fiber and thus may be justified in some cases.

The extrusion can be effected through one or more orifices provided in a plate which forms the bottom or end of an extrusion container pressurized to force the slip through the orifice openings. This general arrangement is known from the synthetic fiber making art. However, in the practice of the invention it is highly preferred to depart from the use of a simple orifice plate and employ, instead, one or more nozzle tubes having very thin walls as it has been found that such tend to plug much less than the perforated orifice plates employed in the synthetic fiber making arts. The reason for this behavior seems to be related to a buildup of dried or semi-dried slip which starts to accumulate around an orifice tending to obstruct it. The thin tube nozzles tend to minimize the accumulation at the orifice edges which in turn reduces the incidence of orifice outlet constriction and attendant fiber fracture. A very suitable source of the orifice nozzles is to employ hypodermic needles which have blunt ends and a length of 0.5 centimeters or less. Longer lengths may be used but extrusion pressure must be correspondingly increased which is a processing disadvantage. Usually the application of relatively modest pressure to the extrusion container is sufficient to extrude the slip through the orifice openings, typical pressure levels ranging from 5 or 10 psi up to 100 or more psi may be employed depending upon the size of the orifice opening and the thickness or solids content of the slip, in general accordance with the flow of viscous liquids.

Another technique useful in forming the fibers is centrifugal extrusion in a spinning chamber provided with extrusion orifices around its cicumference. This approach can interfere with fiber attenuation.

In addition to the initial extrusion through an orifice the fibers produced with the improved slip can be subjected to a very substantial amount of attenuation which is simply a stretching which very substantially reduces the diameter of the fiber while very greatly increasing its length. For instance, employing an orifice opening of 300 microns attenuation can reduce the fiber diameter to near 20 microns, a diameter reduction by a factor of 15 and an attendant fiber lengthening of some 225 times. A preferred practice in the invention contemplates an attenuation of at least 4 times based on diameter and still more preferred an attenuation of at least 10 times.

The fibers are suitably taken up on a reel or spool because of their very considerable length. The spool by rotating at a rate disproportionately higher than the linear rate at which the fiber exits the extrusion orifice can produce the desired tension which in turn produces the desired fiber attenuation. The reel or take-up drum can be situated a distance of 0.1 to 5 or more meters from the extrusion orifices where ambient air is employed as the drying media. A preferred practice is to locate the take-up drum 2 to 4 meters below the extrusion orifice.

The temperature of the drying media can exert some influence on the fiber forming and attenuation characteristics. For instance, a heated gas, especially if forced movement thereof is employed, can exert considerably increased drying rates over ambient air. Forced movement of the drying media is always preferred to provide a controlled drying atmosphere and collected to remove evaporated volatile substances. The use of the heated drying media while accelerating drying can retard attenuation by excessively drying the fibers leaving them less stretchable. On the other hand the use of a relatively cool ambient, for instance 10° C air, may permit more fiber attenuation than room temperature, 27° C, where which effect has been observed in making alumina fibers. Employing the trichloroethylene solvent drying at 10° C proceeds at approximately one-half the rate as at 27° C but at the lower temperature the take-up speed on the drum has to be increased to keep the system in balance and as a result of the attendant attenuation the fiber reeled onto the drum is significantly finer in diameter, by about 25%. The solvent content in the vapor phase can also be used to control drying rate.

The fibers are removed from the take-up drum by cutting through the fibers on the drum parallel to the axis of the drum which produces a multitude of fibers having length corresponding to the circumference of the drum, or at least the circumference described by the fiber upon the drum. This fiber length which can be 6 or 36 inches, or any length desired by selecting the drum diameter appropriately, is quite useful and convenient in the firing operation. The fibers are then heated to sintering temperature which is typically from 1400° to 1600° C, the higher temperatures tending to produce better bonding in the fibers which in turn, however, tends to reduce flexibility and tensile strength of the fibers.

In accordance with the invention fibers of rather substantial green length are provided at relatively high rates of speed. For instance, a take-up speed of from 500 to 1,000 feet per minute can be employed for runs of several minutes and green fiber lengths in excess of 200,000 feet have been produced. Quite obviously sintering a fiber 200,000 feet in length and using such a fiber could be quite troublesome and this is why the fibers are advantageously severed prior to removal from the drum to provide convenient predetermined desired lengths. Upon firing, slight bonding between fibers occurs which necessitates a mechanical separation after firing. Due to this, the final product consists of fiber which can be several centimeters in length but more typically 1 cm or less. Typical fiber diameter can range from a few microns up to 50 or 60 or even more if such would be desired although the thicker fibers are, for the most part, less desirable than the thinner fibers since the thinnest fibers provide the best thermal insulation. A very desirable fiber diameter can be produced with a good degree of consistency, the diameter ranging from 20 to 25 microns which fiber offers great utility in the thermal insulation field not to mention other fields of potential application such as composite strengthening.

What is claimed is:

1. In the fabrication of polycrystalline ceramic oxide fibers the steps of
   1. forming elongate green thread from a substantially non-aqueous slip consisting essentially of not more than 80 weight percent of discrete temperature stable phase crystalline particles of ceramic oxides selected from the group consisting of alumina, zirconia, zircon, magnesia, chromia, iron oxide, spinel or combinations thereof, the said particles constituting substantially all of the ceramic oxide content of said slip and having a median diameter of 0.05 to 2.5 microns, dispersed in a volatile organic solvent consisting essentially of a halogenated hydrocarbon which solvent contains dissolved therein a linear chain polyethylene oxide polymer binder having an average molecular weight of at least about 400,000 and present in amounts of 0.5 to 5% of the solvent weight, said organic solvent having a surface tension of not over 50 dynes per centimeter and being selected as to dissolve said amount of polyethylene oxide polymer and form a pituitous slip therewith,
   2. displacing the green thread substantially concurrent with its formation through an evaporative environment to remove sufficient volatile fluid therefrom to render the thread substantially self-supporting, while attenuating said green thread to increase its length and decrease its diameter by a factor of at least 4, said attenuation being effected by exerting on said green thread a tensile force to effect movement of the green thread at a higher rate than its rate of formation,
   3. and sintering the green thread to produce a coherent polycrystalline ceramic oxide fiber in the said temperature stable phase having a ceramic bond intermediate the particles thereof.

2. The method according to claim 1 wherein the volatile organic solvent is a chlorinated hydrocarbon.

3. The method according to claim 1 wherein the volatile organic solvent is selected from the group consisting of trichloroethylene, ethylene dichloride, tetrachloroethane and (1,1,2) trichloroethane.

4. The method according to claim 1 wherein said ceramic particles comprise alpha phase alumina.

5. The method according to claim 1 wherein the elongate thread is formed by extrusion through a tubular nozzle.

6. The method according to claim 1 wherein the elongate green thread is formed by extrusion through an orifice having a diameter of less than 1000 microns.

7. The method according to claim 8 wherein prior to said extrusion said slip is filtered through a filter media having openings therein not greater than one-half the diameter of the extrusion orifice.

8. The method according to claim 1 wherein said slip contains less than 15%, based on the weight of the solvent, of a compatibly plasticized resinous binder.

9. The method according to claim 8 wherein said slip contains an additional solvent to assure dissolution of said additional binder.

10. The method according to claim 1 wherein said high molecular weight linear chain polyethylene oxide polymer has an average molecular weight of 600,000 to 1,500,000 and is present in amounts of 5 to 2% of the weight of said volatile organic solvent.

11. The method according to claim 1 wherein said ceramic particles constitute 5 to 80% of the slip composition.

12. The method according to claim 1 wherein said ceramic particles constitute 25 to 60% of the slip composition.

13. The method according to claim 1 wherein the slip contains an effective dispersant present in an amount of 0.1 to 5% of the ceramic particles.

14. In the fabrication of polycrystalline ceramic oxide fibers the steps of
   1. forming a pituitous slip by:
      a. dispersing discrete temperature stable phase particles of a ceramic oxide selected from the group consisting of alumina, zirconia, zircon, magnesia, chromia, iron oxide, spinel or combinations thereof and having a median diameter of less than 2.5 microns in a solvent selected from the group consisting of trichloroethylene, ethylene dichloride, tetrachloroethane and (1,1,2) trichloroethane along with an effective dispersant, present in the amount of less than 5% of the weight of solids, said dispersion being accomplished by agitation employing substantial sheer effects to assure effective dispersion,
      b. dissolving in an additional quantity of said defined solvent an effective amount of 0.5 to 5.0% of a high molecular weight linear chain polyethylene oxide polymer having an average molecular weight of at least approximately 400,000,
      c. adding to at least one of the suspensions produced in the above said steps (1a) and (1b) an effective amount of a compatibly plasticized resinous binder as a slip strengthener along with sufficient additional solvent compatible with both said defined solvent and said additional resinous binder,
      d. combining the alumina dispersion and the binder solution set forth in said steps (1a) and (1b) above and mixing them to provide said slip,
   2. forming an elongate green thread from said slip by extruding said slip through at least one elongate extrusion nozzle having a diameter of 200 to 700 microns and a length of not more than 1 centimeter nor less than 0.1 centimeter, the slip, prior to extrusion, having been filtered by passing through a filter media having openings therethrough of not greater than one-half the size of the orifice openings,
3. moving said green thread through an evaporative environment substantially concurrent with the formation thereof to remove sufficient volatile fluid therefrom to render said green thread substantially self-supporting while concurrently attenuating said green thread to increase its length by a factor of at least 16, the attenuated thread being continuously wound upon a take-up drum,
4. removing an accumulation of fibers from said take-up drum by slicing through said accumulation along a line parallel to the axis of said drum to provide multiplicities of fibers having lengths related to the diameter of the drum and the fiber position thereupon,
5. sintering said multiplicities of green threads to produce multiplicities of coherent polycrystalline alumina fibers having ceramic bonds intermediate the particles thereof.

15. The method according to claim 14 wherein in said step 1b said solvent is divided into two subportions, one of which being cooled to a temperature of 10° C or less and said polymer is added to said cooled portion and then dispersed therethrough by agitation after which the remaining subportion of said solvent is added thereto at a higher temperature.

16. The method according to claim 15 wherein said ceramic particles comprise alpha phase alumina.

17. In the production of polycrystalline ceramic oxide fibers, the steps of:

1. forming elongate green thread from a slip composed of not more than 60 weight percent of discrete temperature stable phase particles of ceramic oxides selected from the group consisting of alumina, zirconia, zircon, magnesia, chromia, iron oxide, spinel or combinations thereof, said particles constituting substantially all of the ceramic oxide content of said slip and having a median diameter of 0.05 to 2.5 microns dispersed in a volatile organic solvent consisting essentially of at least one solvent selected from the group consisting of trichloroethylene, ethylene dichloride, tetrachloroethane and (1,1,2) trichloroethane, which solvent contains dissolved therein a high molecular weight linear chain polyethylene oxide binder present in amounts of 0.5 to 5% of the solvent weight, the thread being formed by extruding the slip through a small diameter elongate thin walled tubular nozzle,
2. displacing the green thread so formed, substantially concurrent with its formation, through an evaporative environment to remove sufficient volatile fluid therefrom to render the thread substantially self-supporting while attenuating said green thread to increase its length and decrease its diameter by a factor of at least 4, said attenuation being effected by exerting on said green thread a tensile force to effect movement of the green thread at a higher rate than its rate of emission from said nozzle,
3. sintering the attenuated green thread to produce a coherent polycrystalline ceramic fiber having a ceramic bond intermediate the particles thereof.

* * * * *

UNITED STATES PATENT AND TRADEMARK OFFICE
CERTIFICATE OF CORRECTION

PATENT NO. : 4,071,594
DATED : January 31, 1978
INVENTOR(S) : Alan Pearson et al It is certified that error appears in the above–identified patent and that said Letters Patent are hereby corrected as shown below:

| | |
|---|---|
| Col. 1, line 25 | Change "restict" to --restrict--. |
| Col. 3, line 29 | Change "or" (second occurrence) to --of--. |
| Col. 3, line 42 | Change "Obviating" to --Obviously--. |
| Col. 5, line 22 | Change "(1,1,1)" to --(1,1,2)--. |
| Col. 6, line 50 | Change "6" to --60--. |
| Col. 8, line 23 | Change "suspensions" to --suspension--. |
| Col. 8, line 54 | After "oxide-solvent" insert --solution--. |
| Col. 11, line 61 (Claim 2) | After "claim" insert --1--. |
| Col. 12, line 7 (Claim 7) | Change "claim 8" to --claim 6--. |

Signed and Sealed this

Sixteenth Day of May 1978

[SEAL]

Attest:

RUTH C. MASON
Attesting Officer

LUTRELLE F. PARKER
Acting Commissioner of Patents and Trademarks